United States Patent
Ahmed

(10) Patent No.: US 12,281,048 B1
(45) Date of Patent: Apr. 22, 2025

(54) MESOPOROUS NANOCOMPOSITE

(71) Applicant: IMAM MOHAMMAD IBN SAUD ISLAMIC UNIVERSITY, Riyadh (SA)

(72) Inventor: Ehab Abdelhamed Abdelrahman Ahmed, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/970,659

(22) Filed: Dec. 5, 2024

(51) Int. Cl.
*C04B 35/488* (2006.01)
*C04B 35/624* (2006.01)
(Continued)

(52) U.S. Cl.
CPC .......... *C04B 35/488* (2013.01); *C04B 35/624* (2013.01); *C04B 35/62655* (2013.01); *C04B 35/64* (2013.01); *C04B 38/0054* (2013.01); C04B 2235/3244 (2013.01); C04B 2235/3268 (2013.01); C04B 2235/443 (2013.01); C04B 2235/444 (2013.01); C04B 2235/606 (2013.01); C04B 2235/656 (2013.01);
(Continued)

(58) Field of Classification Search
CPC .... C04B 35/488; C04B 35/624–62695; C04B 38/0051; C04B 38/0054; C04B 38/0058
See application file for complete search history.

(56) References Cited

U.S. PATENT DOCUMENTS 7,569,512 B2 * 8/2009 Weissman .............. B01J 23/464
502/325
2020/0070136 A1 3/2020 Scher et al.

FOREIGN PATENT DOCUMENTS

CN 111790374 B 8/2021
CN 116496082 B 4/2024
(Continued)

OTHER PUBLICATIONS

Persson. Materials Data on Mg6MnO8 (SG:225) by Materials Project. retrieved from https://legacy.materialsproject.org/materials/mp-19239/ on Feb. 12, 2025. published Nov. 2014 (Year: 2014).*
(Continued)

*Primary Examiner* — Matthew E. Hoban
(74) *Attorney, Agent, or Firm* — Oblon, McClelland, Maier & Neustadt, L.L.P.

(57) ABSTRACT

A particulate mesoporous nanocomposite having the general formula $ZrO_2 \cdot Mg_6MnO_8$, wherein the nanocomposite comprises a monoclinic zirconium dioxide ($ZrO_2$) crystalline phase, a tetragonal $ZrO_2$ crystalline phase, and a cubic magnesium manganese oxide ($Mg_6MnO_8$) crystalline phase. The nanocomposite may be obtained by a method comprising: forming an aqueous mixture by adding an aqueous solution of a chelating agent into an aqueous solution of a magnesium salt, a manganese salt and a zirconium salt; adding a polyol in the aqueous mixture to form a gel; heating the gel under stirring at a temperature of about 200° C. to about 400° C. for a sufficient duration to form a dry powder; and, calcining the dry powder at a temperature of about 700° C. to about 1000° C. to form the nanocomposite material.

19 Claims, 7 Drawing Sheets

(51) Int. Cl.
  *C04B 35/626* (2006.01)
  *C04B 35/64* (2006.01)
  *C04B 38/00* (2006.01)

(52) U.S. Cl.
  CPC .. *C04B 2235/762* (2013.01); *C04B 2235/765* (2013.01); *C04B 2235/781* (2013.01)

(56) References Cited

FOREIGN PATENT DOCUMENTS

| | | |
|---|---|---|
| CN | 116422285 B | 9/2024 |
| CZ | 2020-00490 A3 | 6/2021 |

OTHER PUBLICATIONS

Costa. Promising Mn-based oxygen carriers for Chemical Looping Combustion of gaseous fuels. Energy Procedia 114 ( 2017 ) 334-343 (Year: 2017).*

Dmytro Pavlyuchkov, et al., "Phase Equilibria in the ZrO2—MgO—MnOx System", Journal of the American Ceramic Society, vol. 99, No. 9. May 30, 2016. pp. 3136-3145. 16 pages.

Rasha.A. Abumousa, et al.. "MgO@Z:02@g•C3N4 composite for efficient photodegradation of alizarin red dye", Inorganic Chemistry Communications, vol. 155, Sep. 2023, 111086, 6 pages.

* cited by examiner

MESOPOROUS NANOCOMPOSITE

STATEMENT OF ACKNOWLEDGEMENT

Support provided by the Imam Mohammad Ibn Saud Islamic University (IMSIU) is gratefully acknowledged.

BACKGROUND

Technical Field

The present disclosure is directed towards nanomaterials, and more particularly, towards a mesoporous nanocomposite having the general formula $ZrO_2 \cdot Mg_6MnO_8$ and a method of preparation thereof.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Nanomaterials with dimensions in the nano-scale range of 1 nanometers (nm) to 100 nm, offer desirable properties for applications in the electronics industry, in the catalyst industry, and in medicine. However, producing pure nanomaterials may be challenging and economically taxing due to the high precision required in the synthesis of nanomaterial, and the need for advanced equipment and controlled environments.

It is considered that incorporating nanomaterials into nanocomposites as additives may provide an effective solution in order to reduce costs and expand field of applications for nanomaterials, improving the accessibility of nanomaterials across a number of industries. In general, nanocomposites are advanced materials that embed nanoparticles in a matrix to enhance properties like strength, stability, and conductivity. The structural characteristics of the nanocomposites may be desirable for catalysis, energy storage, separation technologies, environmental remediation, electronics, and biomedicine, offering superior performance over traditional materials. However, synthesizing nanocomposites may be challenging due to high operational costs, high temperature requirements and lengthy processing requirements; existing synthesis processes may also yield nanocomposites of irregular particle sizes and/or of inconsistent porosity, affecting the overall material performance of such nanocomposites. Furthermore, several techniques for the generation of metal oxide nanocomposites are limited by high synthesis temperatures and the need for extensive milling and post-treatment steps, which contribute to non-uniform particle size distribution. Overcoming these challenges is essential for optimizing the performance and commercial viability of mixed metal oxide nanomaterials. Presently, efforts are being made to develop efficient, reproducible synthesis methods for mixed metal oxide based nanocomposites.

Existing methods for producing mixed metal oxide nanocomposites include sol-gel synthesis, hydrothermal methods, solvothermal methods, co-precipitation, chemical vapor deposition (CVD), and mechanical milling. Each method offers advantages but also presents notable limitations. The sol-gel technique, for instance, is widely used as it may achieve homogeneity at a molecular level, but concomitantly the sol-gel technique often involves lengthy processing times and costly precursors. Hydrothermal and solvothermal methods allow for fine-tuning of crystal structure and morphology under high-pressure and high-temperature conditions, yet they require specialized equipment and may be energy-intensive, which results in high financial and environmental burdens. Co-precipitation is a simple and cost-effective technique for producing nanoparticles, but it often results in uncontrolled particle sizes and agglomeration, affecting the consistency of the composite material. Further, chemical vapor deposition may achieve high purity and uniformity, but concomitantly requires high temperatures and complex setups, which can limit scalability. These drawbacks highlight the need for improved, efficient, and cost-effective synthesis methods to produce high-quality nanocomposites with controlled structure, stability, and functionality for advanced applications.

Accordingly, one object of the present disclosure is to provide a particulate mesoporous nanocomposite having the general formula $ZrO_2 \cdot Mg_6MnO_8$, and a method of synthesizing thereof, that may circumvent the drawbacks and limitations, such as, high costs, poor scalability, uniformity and defects of the materials and methods already known in the art.

SUMMARY

In an exemplary embodiment, a particulate mesoporous nanocomposite is described. The nanocomposite has a general formula $ZrO_2 \cdot Mg_6MnO_8$. The nanocomposite comprises, as determined by X-ray diffraction (XRD), a monoclinic zirconium dioxide ($ZrO_2$) crystalline phase, a tetragonal $ZrO_2$ crystalline phase, and a cubic magnesium manganese oxide ($Mg_6MnO_8$) crystalline phase.

In some embodiments, the particulate nanocomposite comprises, based on the weight of the nanocomposite, from about 70 percent by weight (wt. %) to about 90 wt. % of $ZrO_2$; and, from about 10 wt. % to about 30 wt. % of $Mg_6MnO_8$.

In some embodiments, the particulate nanocomposite comprises, based on the weight of the nanocomposite: from about 75 to about 85 wt. % of $ZrO_2$; and, from about 15 to about 25 wt. % of $Mg_6MnO_8$.

In some embodiments, based on the total weight of $ZrO_2$, at least about 90 wt. % of the $ZrO_2$ is in the monoclinic crystalline phase.

In some embodiments, based on the total weight of $ZrO_2$, at least about 92 wt. % of the $ZrO_2$ is in the monoclinic crystalline phase.

In some embodiments, the particulate nanocomposite material has a surface area of from about 10 square meters per gram ($m^2/g$) to about 30 $m^2/g$, as determined by Brunauer-Emmett-Teller (BET) analysis.

In some embodiments, the particulate nanocomposite material has a surface area of from about 10 $m^2/g$ to about 20 $m^2/g$, as determined by BET analysis.

In some embodiments, the particulate nanocomposite has, as determined by Barrett-Joyner-Halenda (BJH) desorption analysis, a median pore diameter of from about 2 nanometers (nm) to about 5 nm, and a pore volume of from about 0.01 gram per cubic centimeter ($cm^3/g$) to about 0.1 $cm^3/g$.

In some embodiments, the particulate nanocomposite has, as determined by BJH desorption analysis, a median pore diameter of from about 2 nm to about 4 nm, and a pore volume of from about 0.01 $cm^3/g$ to about 0.05 $cm^3/g$.

In some embodiments, the median crystallite size of the particulate nanocomposite is from about 60 nm to about 70 nm, as determined by XRD.

In another exemplary embodiment, a method for preparing the particulate mesoporous nanocomposite is described. The method comprises forming an aqueous mixture by adding, in a dropwise manner, an aqueous solution of a chelating agent into an aqueous solution of a magnesium salt, a manganese salt and a zirconium salt. The method further comprises adding a polyol in a dropwise manner into the aqueous mixture to form a gel, heating the gel under stirring at a temperature of from about 200° C. to about 400° C. for a sufficient duration to form a dry powder, and calcining the dry powder at a temperature of from about 700° C. to about 1000° C. to form the nanocomposite material.

In some embodiments: i) the magnesium salt is selected from the group consisting of magnesium sulfate ($MgSO_4$), magnesium nitrate ($Mg(NO_3)_2$), magnesium chloride ($MgCl_2$) and magnesium acetate ($Mg(CH_3COO)_2$); ii) the manganese salt is selected from the group consisting of manganese sulfate ($MnSO_4$), manganese nitrate ($Mn(NO_3)_2$), manganese chloride ($MnCl_2$) and manganese acetate ($Mn(CH_3COO)_2$); iii) the zirconium salt is selected from the group consisting of zirconium oxysulfate ($ZrOSO_4$), zirconium oxychloride ($ZrOCl_2$) and zirconium oxynitrate ($ZrO(NO_3)_2$); or, any combination of i) to iii) may be applicable. Expressed differently, the aforementioned embodiments i) to iii) for the selection of the magnesium salt, manganese salt and zirconium salt are not mutually exclusive.

In some embodiments, the magnesium salt is magnesium nitrate ($Mg(NO_3)_2$), the manganese salt is manganese nitrate ($Mn(NO_3)_2$), and the zirconium salt is zirconium oxychloride ($ZrOCl_2$).

In some embodiments, the chelating agent comprises at least one hydroxyalkyl carboxylic acid selected from the group consisting of citric acid ($C_6H_8O_7$), tartaric acid ($C_4H_6O_6$), malic acid ($C_4H_6O_5$), mandelic acid ($C_8H_8O_3$), and 12-hydroxystearic acid ($C_{18}H_{36}O_3$).

In some embodiments, the chelating agent comprises tartaric acid ($C_4H_6O_6$).

In some embodiments, the polyol has a number average molecular weight of from about 200 grams per mole (g/mol) to about 5000 g/mol. and a hydroxyl number of from about 25 milligrams of potassium hydroxide per gram (mg KOH/g) to about 500 mg KOH/g.

In some embodiments, the polyol is selected from the group consisting of polyester polyols, polyether polyols, poly(ether-ester) polyols, poly(alkylene carbonate) polyols and mixtures thereof.

In some embodiments, the polyol comprises a polyoxy ($C_2$-$C_3$)alkylene polyol.

In some embodiments, the polyol comprises a polyoxy ($C_2$-$C_3$)alkylene polyol having a number average molecular weight of from about 200 g/mol to about 5000 g/mol, and a hydroxyl number of from about 25 mg KOH/g to about 500 mg KOH/g.

In yet another exemplary embodiment, a heterogeneous catalyst comprising the particulate mesoporous nanocomposite is described.

In yet another exemplary embodiment, a filtration membrane comprising the particulate mesoporous nanocomposite is described.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
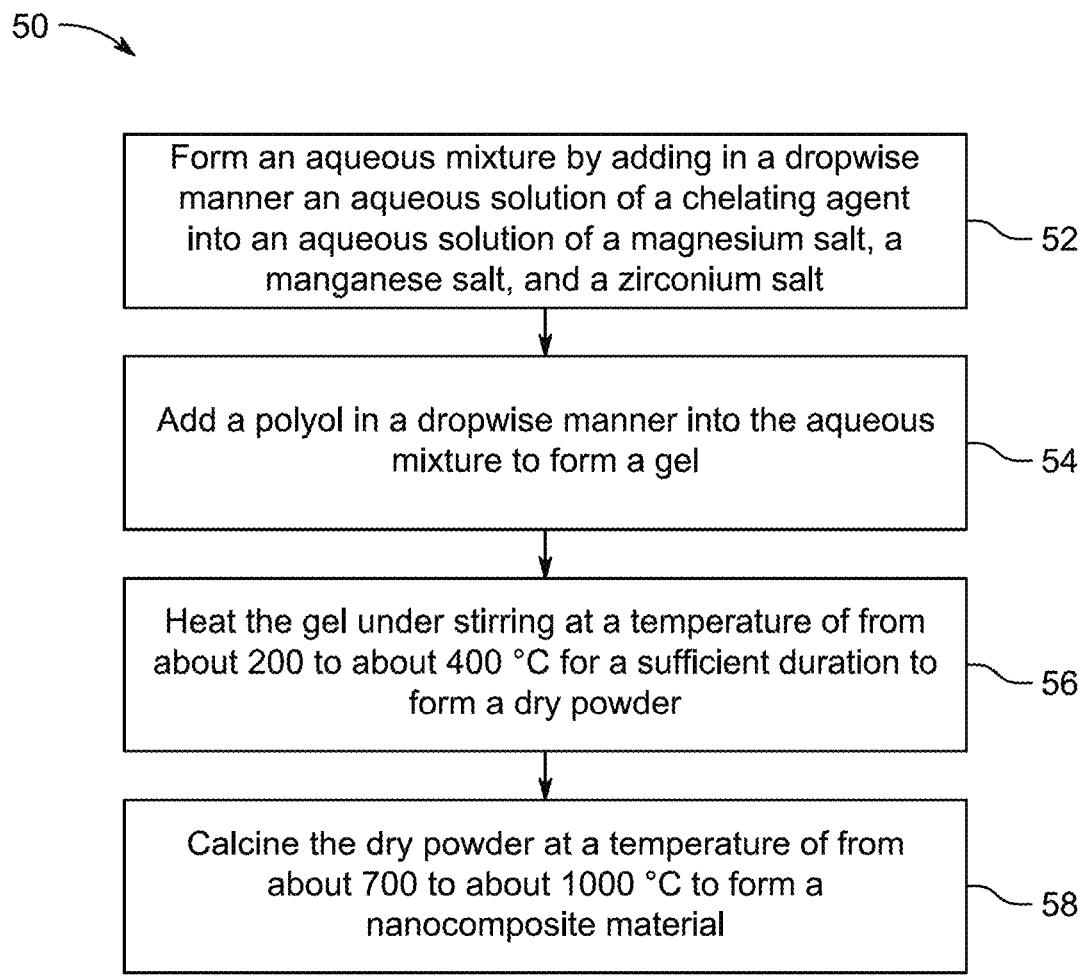
FIG. 1 is a schematic flow chart depicting a method of forming a mesoporous nanocomposite, according to certain embodiments.

As used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

The term 'fraction' as used herein refers to a numerical quantity which defines a part up to but not including 100 percent or the entirety of the thing in question.

As used herein, number average molecular weight (Mn) and weight average molecular weight (Mw) are determined by gel permeation chromatography (GPC) with tetrahydrofuran (THF) as the eluent in accordance with DIN 55672-1:2007-08.

As used herein, the term 'particle' refers to a small object that acts as a whole unit with regard to its transport and properties. As used herein, 'nanoparticles'—sometimes contracted herein to NPs-refers to particles having a particle size of 1 nanometer (nm) to 1000 nm.

Unless otherwise stated, the term 'particle size' refers to the largest axis of the particle. In the case of a generally spherical particle, the largest axis is the diameter.

The term 'median volume particle size' (Dv50), as used herein, refers to a particle size corresponding to 50% of the volume of the sampled particles being greater than and 50% of the volume of the sampled particles being smaller than the recited Dv50 value. Similarly, if used, the term 'Dv10' refers to a particle size corresponding to 10% of the volume of the sampled particles being smaller than and 90% of the volume of the sampled particles being greater than the recited Dv10 value. Particle size is determined herein by Scanning Electron Microscopy (SEM).

As used herein 'aspect ratio' is defined as the ratio of the particle diameter located perpendicular to the maximum diameter (i.e., the Aspect Diameter) to the maximum diameter. The aspect ratio can be evaluated by image analyses of oriented particles. If the aspect ratio is being determined on a collection of particles, the aspect ratio may be measured on a few representative particles and the results averaged: representative particles should be sampled by ASTM D5680-95a (Reapproved 2001).

As used herein, the Brunauer-Emmett-Teller (BET) analysis references the method of measuring the specific surface area ($m^2/g$) of a solid material via the adsorption of gas molecules onto the surface of the solid, as detailed in standard NF ISO 5794-1, Appendix E (June 2010).

As used herein, the Barrett, Joyner, and Halenda (BJH) desorption analysis refers to the method of determining the volume of mesopores per unit mass (mL/g) of a solid material utilizing the adsorption and desorption isotherms associated with gas molecules inside the mesopores of the solid, as detailed in Technical Standard DIN 66134:1998-02.

As used herein, '$C_1$-$C_n$ alkyl' group refers to a monovalent group that contains from 1 to n carbons atoms, that is a radical of an alkane and includes straight-chain and branched organic groups. As such, a '$C_1$-$C_4$ alkyl' group refers to a monovalent group that contains from 1 to 4 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; and, tert-butyl. In the present disclosure, such alkyl groups may be unsubstituted or may be substituted with one or more halogen. Where applicable for a given moiety (R), a tolerance for one or more non-halogen substituents within an alkyl group will be noted in the specification.

The term 'alkylene' refers to a divalent radical derived from an alkyl group as defined above.

The term 'polyoxyalkylene'-alternatively referenced as polyalkylene oxide-refers herein to an aliphatic polyether which is built from repeated-O-A-units, wherein A is alkylene, for instance $C_2$-$C_5$ alkylene. The term 'polyoxy ($C_2$-$C_3$)alkylene' encompasses polyoxyethylene, polyoxypropylene and poly(oxyethylene-co-oxypropylene).

The term 'polyol' as used herein shall include diols and higher functionality hydroxyl compounds. The term 'polyether polyol' refers to a compound, which may be linear or branched, that contains at least two ether groups and at least two hydroxyl groups. The term 'polyester polyol' references a polymeric compound, which may be linear or branched, that contains at least two ester linkages and at least two hydroxyl groups. Correspondingly, the term 'poly(ether-ester) polyol' refers to a polyol containing both ether linkages (C—O—C) and ester linkages (R—COO—R) within its structure.

The term 'hydroxyl number' as used herein is defined as the mass in milligrams of potassium hydroxide required to neutralize the acetic acid taken up on acetylation of one gram of a chemical substance that contains free hydroxyl groups. Where stated, the hydroxyl number is determined in accordance with ASTM D4274-11.

The term 'dropwise' as used herein means that one discrete drop or aliquot of a liquid, irrespective of its size or volume, is administered at a time. Discrete drops or aliquots are administered consecutively: they may be provided at regular intervals, at irregular intervals or both such intervals may be applied over the course of administration of the liquid. Further, the volume of an aliquot or drop may be independently determined and thus may be varied over the course of administration of the liquid. Exemplary devices for dropwise addition of liquids include syringes and columns.

As used herein, the term 'Pechini sol-gel method' refers to the synthetic process used to produce metal oxide and composite materials by forming a sol through the polymerization of metal salts in a solvent, typically with the help of a chelating agent and an organic compound such as a polyol. The sol is then converted into a gel by the addition of a gelling agent, and, upon heating, the gel undergoes a transformation into a solid metal oxide or composite material.

The term 'sol' as used herein, refers to a colloidal suspension of solid particles in a continuous liquid medium.

As used herein, the term 'gel' refers to a viscoelastic or semi-solid phase that may form when a sol undergoes a transition to a more structured, three-dimensional network. This transition may occur through polymerization or cross-linking, typically facilitated by the addition of a gelling agent or by partial evaporation of the liquid medium of the sol. The result is a gel in which the liquid phase is entrapped within a solid network, creating a material that is free-standing or self-supporting—in that its yield value is greater than the sheer stress imposed by gravity—but which is still composed of a significant amount of liquid.

A monoclinic crystalline phase refers to a crystal structure in which the unit cell of the material is characterized by three unequal axes, with two of them forming an angle that is not 90°, while the third axis is perpendicular to the plane formed by the other two axes. In other words, the monoclinic crystal system has one axis that is tilted, resulting in a lack of orthogonality between all three axes. The unit cell in the monoclinic phase is thus asymmetrical, with distinct axial lengths and one non-90° angle.

A tetragonal crystalline phase refers to a crystal structure in which the unit cell of the lattice has two axes of equal-length and a third axis that is of different length, but wherein all axes are at right angles) (90° to each other. This crystal system may be represented as a square base (with two equal axes) and a height (the third axis) which is different, resulting in a rectangular prism-like shape. The tetragonal crystal structure possesses a four-fold rotational symmetry around its unique axis.

A cubic crystalline phase refers to a crystal structure where the unit cell is shaped like a cube, with three equal-length axes that are perpendicular to each other (at 90° angles). In this crystal system, the atoms or ions are arranged in a repeating pattern within the cubic lattice. The cubic crystalline structure is highly symmetric, possessing four threefold rotational axes and three fourfold rotational axes, permitting rotations of 90° around its specific axes and rotations of 120° about the body diagonals of the cube, while maintaining the same structure.

The present disclosure is intended to include all hydration states of a given compound or formula, unless otherwise noted or when heating a material.

Aspects of the present disclosure are directed to a nanocomposite material composed of zirconia ($ZrO_2$) and magnesium-manganese oxides ($Mg_6MnO_8$), synthesized using a simplified Pechini sol-gel method. The composite structure offers enhanced surface area, controlled particle size, and superior structural properties, making it particularly effective in applications such as adsorption and catalysis. The material exhibits mesoporous characteristics, with a well-defined crystalline phase combination and high surface roughness, which contributes to its high performance. The present disclosure addresses limitations in the art by providing a more efficient, scalable method for producing high-performance materials with improved adsorption capacities, making it suitable for environmental and industrial uses.

A particulate mesoporous nanocomposite is disclosed having the general formula $ZrO_2 \cdot Mg_6MnO_8$ and which includes, as determined by X-ray diffraction, a monoclinic $ZrO_2$ crystalline phase, a tetragonal $ZrO_2$ crystalline phase and a cubic $Mg_6MnO_8$ crystalline phase.

The nanocomposite comprises, based on the weight of the nanocomposite: from about 70 to about 90 wt. % preferably from about 75 to about 85 wt. %, more preferably from about 75 to about 80 wt. % and most preferably about from about 78 to about 80 wt. % of $ZrO_2$; in toto and, from about 10 to about 30 wt. %, preferably from about 15 to about 25 wt. %, more preferably from about 20 to about 25 wt. % and most preferably from about 20 to about 22 wt. % $Mg_6MnO_8$. The term 'in toto' is used to denote that the aforementioned ranges reference the total amount of $ZrO_2$, independently of the crystalline phase of that $ZrO_2$.

Based on the total weight of $ZrO_2$ in the nanocomposite, at least about 75 wt. %, preferably at least about 80 wt. %, more preferably at least about 85 wt. %, even more preferably at least about 90 wt. % and most preferably from about 92 to about 98 wt. % of $ZrO_2$ is in the monoclinic crystalline phase. In a preferred embodiment, about 95 wt. % of the $ZrO_2$ is in the monoclinic crystalline phase, based on the total weight of $ZrO_2$.

FIG. 1 illustrates a flow chart of a method 50 for preparing the mesoporous nanocomposite. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes forming an aqueous mixture by adding in a dropwise manner an aqueous solution of a chelating agent into an aqueous solution of a magnesium salt, a manganese salt and a zirconium salt. The magnesium salt can be an inorganic or an organic salt and may, in certain embodiments, be selected from the group consisting of magnesium sulfate ($MgSO_4$), magnesium nitrate ($Mg(NO_3)_2$), magnesium chloride ($MgCl_2$), magnesium oxide, magnesium citrate, magnesium hydroxide, magnesium acetate ($Mg(CH_3COO)_2$) and mixtures thereof. In a preferred embodiment, the magnesium salt is magnesium nitrate ($Mg(NO_3)_2$).

The manganese salt may, in certain embodiments, be selected from the group consisting of manganese sulfate ($MnSO_4$), manganese nitrate ($Mn(NO_3)_2$), manganese chloride ($MnCl_2$), manganese acetate ($Mn(CH_3COO)_2$), manganese carbonate, manganese tetroxide, manganese dioxide, potassium permanganate, manganese gluconate, manganese oxide and mixtures thereof. In a preferred embodiment, the manganese salt is manganese nitrate ($Mn(NO_3)_2$).

The zirconium salt may, in certain embodiments, be selected from the group consisting of zirconium oxysulfate ($ZrOSO_4$), zirconium oxychloride ($ZrOCl_2$), zirconium oxynitrate ($ZrO(NO_3)_2$), zirconium acetate ($Zr(CH_3COO)_4$) and mixtures thereof. In a preferred embodiment, the zirconium salt is zirconium oxychloride ($ZrOCl_2$).

In some embodiments, the aqueous solution includes any combination of soluble magnesium, manganese and zirconium salts. In some embodiments, the water of the aqueous solution may be tap water, distilled water, bi-distilled water, deionized water, deionized distilled water, reverse osmosis water or any combination thereof. In a preferred embodiment, the water is distilled water.

Typically, substantially equimolar amounts of magnesium (Mg), manganese (Mn) and zirconium (Zr) are present in the aqueous solution to which the chelating agent is added at Step 52 of the method illustrated in FIG. 1. In certain embodiments, the molar ratio of Mg: Mn: Zr in the aqueous solution may be from about (0.8-1.2):(0.8-1.2):(0.8-1.2), for example from about (0.9-1.1):(0.9-1.1):(0.9-1.1) or about 1.0:1.0:1.0.

As used herein, the term 'chelating agent' refers to the chemical compound that can form multiple bonds with a single metal ion, resulting in a stable, ring-like structure known as a chelate complex. The agent has multiple donor atoms (e.g., oxygen, nitrogen, sulfur) that can coordinate with the metal ion, effectively clawing the metal and preventing it from engaging in other chemical reactions. This multidentate binding increases the stability of the metal complex compared to simple, monodentate ligands.

The chelating agent of the present disclosure is typically chosen from aminopolycarboyxlic acids, aminophosphonic acids, hydroxyalkyl carboxylic acids and mixtures thereof. Exemplary aminopolycarboyxlic acids include: ethylenediamine disuccinic acid; nitrilotriacetic acid; ethylenediaminetetraacetic acid (EDTA); ethylenediaminetetapropionic acid; diethylene triamine pentaacetic acid (DTPA) and triethylenetetraaminehexacetic acid.

In an important embodiment, the chelating agent comprises at least one hydroxyalkyl carboxylic acid selected from the group consisting of citric acid, tartaric acid, malic acid, mandelic acid and 12-hydroxystearic acid. In a preferred embodiment, the chelating agent comprises tartaric acid.

The total amount of chelating agent added in the dropwise manner at method step 52 of FIG. 1 is at least equimolar and, more typically, in molar excess to the total number of moles of magnesium, manganese and zirconium in the aqueous solution. In certain embodiments, the ratio of the total number of moles of chelating agent to the total number of moles of magnesium, manganese and zirconium is from about 1:1 to about 2:1, for example from about 1.2:1 to about 1.6:1 or from about 1.3:1 to about 1.5:1.

At step 54, the method 50 includes adding a polyol in a dropwise manner into the aqueous mixture to form a gel. Without intention to be bound by theory, the polyol may serve to control the formation of agglomerated particles during the synthesis of the metal oxide nanoparticles through the aqueous sol-gel method. Typically herein, the polyol has: a number average molecular weight of from about 200 to about 5000 g/mol., preferably from about 200 to about 1000 g/mol. and more preferably from 200 to 500 g/mol.; and, a hydroxyl number of from about 25 to about 500 mg, more preferably 200 to 500 mg, and yet more preferably 200 to 300 mg KOH/g.

The polyols having utility in the present disclosure may be monomeric compounds, for instance monomeric aliphatic, cycloaliphatic or aromatic compounds having from 2 to 6 hydroxyl groups per molecule. Exemplary monomeric diols, which may be used alone or in combination include: ethylene glycol; propylene glycol; 1,3-propane diol; 1,2-butane diol; 2-methyl propanediol; 1,3-butane diol; 1,4-butane diol; 2,3-butanediol; neopentyl glycol; hexanediol; decanediol; hexamethylene glycol; cyclohexane dimethanol; polyoxyalkylene glycols, such as diethylene glycol, dipropylene glycol, triethylene glycol, tetraethylene glycol, tripropylene glycol and tetrapropylene glycol; and, aromatic diols such as bisphenol A, bisphenol F, hydrogenated bisphenol A and hydrogenated bisphenol F. Exemplary triols, which may be used alone or in combination include: 1,2,3-propanetriol; 1,2,4-butanetriol; 2-ethyl-2-hydroxymethyl-1,3-propanediol (trimethylolpropane); 3-methyl-1,3,5-pentanetriol; 1,2,3-hexanetriol; 1,2,6-hexanetriol; 2,5-dimethyl-1,2,6-hexanetriol; 1,2,3-heptanetriol; 1,2,3-octanetriol; and, 2-hydroxymethyl-1,3-propanediol. Exemplary tetrols and pentols include: 2,2-bis(hydroxymethyl) propane-1,3-diol (pentaerythritol); pentose; pentopyranose; 6-deoxyhexopyranose; 2,5-anhydrohexitol; 1,5-anhydrohexitol; 6-deoxyhexose; 1-deoxyhexitol; and, pentitol. An exemplary polyol having six hydroxyl groups is D-glucitol (sorbitol).

The present disclosure also provides for the use of polymeric polyols. In an embodiment, the polyol is selected from the group of: polyester polyols; polyether polyols; poly(ether-ester) polyols; poly(alkylene carbonate) polyols; and, mixtures thereof.

Polycarbonate diols having utility herein may be obtained by reacting carbonic acid derivatives with diols. Exemplary carbonic acid derivatives are diaryl carbonates including but not limited to diphenyl carbonate, di($C_1$-$C_6$)alkyl carbonates and phosgene. Exemplary diols include but are not limited to: ethylene glycol; 1,2-propanediol; 1,3-propanediol; 1,3-butanediol; 1,4-butanediol; 1,5-pentanediol; 1,6-hexanediol; cyclohexane dimethanol; diethylene glycol; dipropylene glycol; neopentylglycol; and, mixtures thereof.

Polyester diols having utility herein may be obtained by reacting diols with either aliphatic, aromatic or cycloaliphatic dicarboxylic acids or, in some circumstances, the corresponding anhydrides thereof: the reaction may optionally take place in the presence of an esterification catalyst. Examples of suitable dicarboxylic acids include but are not limited to: adipic acid; glutaric acid; pimelic acid; suberic acid; nonanedicarboxylic acid; decanedicarboxylic acid; succinic acid; maleic acid; sebacic acid; azelaic acid; terephthalic acid; isophthalic acid; o-phthalic acid; tetrahydrophthalic acid; hexahydrophthalic acid; trimellitic acid; and, 1,4-cyclohexanedicarboxylic acid. Examples of suitable anhydrides include succinic, o-phthalic and trimellitic anhydride. It is noted that various commercially available dimeric fatty acids in saturated (hydrogenated) or unsaturated form may also be used as the dicarboxylic acid. And examples of suitable diols for the preparation of the polyester diols are: ethanediol; di-, tri- or tetraethylene glycol; 1,2-propanediol; di-, tri-, tetrapropylene glycol; 1,3-propanediol; 1,4-butanediol; 1,3-butanediol; 2,3-butanediol; 1,6-hexanediol; 1,5-pentanediol; 2,2-dimethyl-1,3-propanediol (neopentylglycol); 1,4-dihydroxycyclohexane; 1,4-dimethylcyclohexane; 1,8-octanediol; 1,10-decanediol; 1,12-decanediol; 2,2,4- and/or 2,4,4-trimethyl-1,3-pentanediol; and, mixtures thereof.

Other useful polyester diols are those obtainable from diol-initiated polymerization of hydroxycarboxylic acids containing from 2 to 12 carbon atoms or a lactone thereof. The hydroxycarboxylic acids may be saturated or unsaturated, linear or branched, of which examples include: glycolic acid; lactic acid; 5-hydroxy valeric acid; 6-hydroxy caproic acid; ricinoleic acid; 12-hydroxy stearic acid; 12-hydroxydodecanoic acid; 5-hydroxydodecanoic acid; 5-hydroxydecanoic acid; and. 4-hydroxydecanoic acid. Examples of suitable lactones are β-propiolactone, δ-valerolactone, ($C_1$-$C_6$)alkyl-valerolactone, ε-caprolactone and ($C_1$-$C_6$)alkyl-ε-caprolactone.

In an embodiment, the polyol is a polyether polyol. Exemplary polyether polyols may be obtained from the polymerization of a cyclic oxide-such as ethylene oxide, propylene oxide or butylene oxide- or by the addition of one or more such oxides to polyfunctional initiators having at least two active hydrogen atoms, such as water, polyhydric alcohols, polythiols, polyamines and alkanolamines.

In a preferred embodiment, the polyol comprises a polyoxy ($C_2$-$C_3$)alkylene polyol having: a number average molecular weight of from about 200 to about 5000 g/mol.; and, an hydroxyl number of from about 25 to about 500 mg KOH/g. For example, the polyol may comprise a polyoxy ($C_2$-$C_3$)alkylene polyol having: a number average molecular weight of from about 200 to about 1000 g/mol. or from about 200 to about 500 g/mol; and, an hydroxyl number of from about 200 to about 500 mg KOH/g. or from about 200 to 300 mg KOH/g. Polyethylene glycol (PEG) 400 may be mentioned as an exemplary polyoxy ($C_2$-$C_3$)alkylene polyol.

Referring back to FIG. 1, at step 54 of the method, the total amount of polyol added in a dropwise manner is conventionally determined by the observed gel formation. However, in certain embodiments, the molar ratio of the total amount of polyol added to the total amount of chelating agent may be from about 1:10 to about 1:2, for example from about 1:10 to about 1:4 or from about 1:10 to about 1:6.

At step 56, the method 50 includes heating the gel under stirring at a temperature of from about 200 to about 400° C., more preferably from about 250 to about 350° C., and yet more preferably about 300° C. for a sufficient duration to form a dry powder. In some embodiments, the heating can be performed by using heating appliances such as ovens, microwaves, autoclaves, hot plates, heating mantles and tapes, oil baths, salt baths, sand baths, air baths, hot-tube furnaces, and hot-air guns.

At step 58, the method 50 includes calcining the dry powder at a temperature of from about 700 to about 1000° C., preferably from about 850 to about 950° C., and more preferably 900° C. to form the particulate nanocomposite material. The calcination is carried out by heating it to a high temperature, under a restricted supply of ambient oxygen. This is performed to remove impurities or volatile substances and to incur thermal decomposition. Typically, the calcination is carried out in a furnace equipped with a temperature control system, which may provide a heating rate of up to about 50° C./min, for example up to about 40° C./min, up to about 30° C./min, up to about 20° C./min, up to about 10° C./min or up to about 5° C./min. In preferred embodiments, the dry powder is calcined for a duration of from about 4 to about 6 hours, such as from about 4.5 to about 5.5 hours or about 5 hours to form the particulate nanocomposite material.

The particulate nanocomposite material may have a surface area of from about 10 to about 30 m²/g, preferably from about 10 to about 20 m²/g, more preferably from about 15 to 18 m²/g, and yet more preferably from 16 to 18 m²/g as determined by Brunauer-Emmett-Teller (BET) analysis. Independently of, or additional to the aforementioned surface area, the particulate nanocomposite material may have, as determined by Barrett-Joyner-Halenda (BJH) desorption analysis: a median pore diameter of from about 2 to about 5 nm, preferably from about 2 to about 4 nm and more preferably from 2.5 to 3.5 nm; and, a pore volume of from about 0.01 to about 0.1 cm$^3$/g, preferably from about 0.01 to about 0.05 cm$^3$/g and more preferably from about 0.02 to about 0.03 cm$^3$/g. The median crystallite size of the particulate nanocomposite is typically from about 60 to about 70 nm, for example from about 65 to about 67 nm, and more preferably about 66 nm, as determined by X-ray diffraction.

In some embodiments, the nanocomposite comprises: from about 35 to about 50 wt. %, preferably from about 45 to 50 wt. %, and more preferably about 47 wt. % of oxygen; from about 10 to about 20 wt. %, preferably from about 15 to about 17 wt. %, and more preferably about 16 wt. % of magnesium; from about 5 to about 15 wt. %, preferably from about 8 to about 12 wt. %, and more preferably about 11 wt. % of manganese; and, from about 15 to about 30 wt. %, preferably from about 25 to about 28 wt. %, and more preferably about 26 wt. % of zirconium.

The particles of $ZrO_2 \cdot Mg_6MnO_2$ nanocomposite obtained by the process of this disclosure may possess various morphological forms. It is envisaged, for example, that particles of $ZrO_2 \cdot Mg_6MnO_2$ that are fibrous, acicular, spherical, ellipsoidal, cylindrical, bead-like, cubic or platelet-like may be present alone or in combination. Moreover, it is envisaged that agglomerates of particles having the same or different morphologies may be present in the nanocomposite.

Figure 5A:
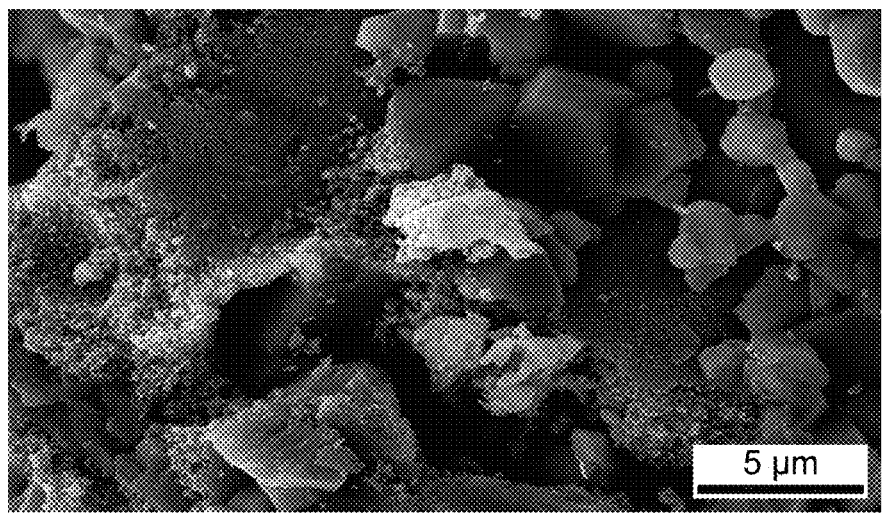
FIG. 5A shows a scanning electron microscope (SEM) image of a $ZrO_2@Mg_6MnO_8$ nanocomposite at a resolution of 5 micrometers (μm), according to certain embodiments.
Figure 5B:
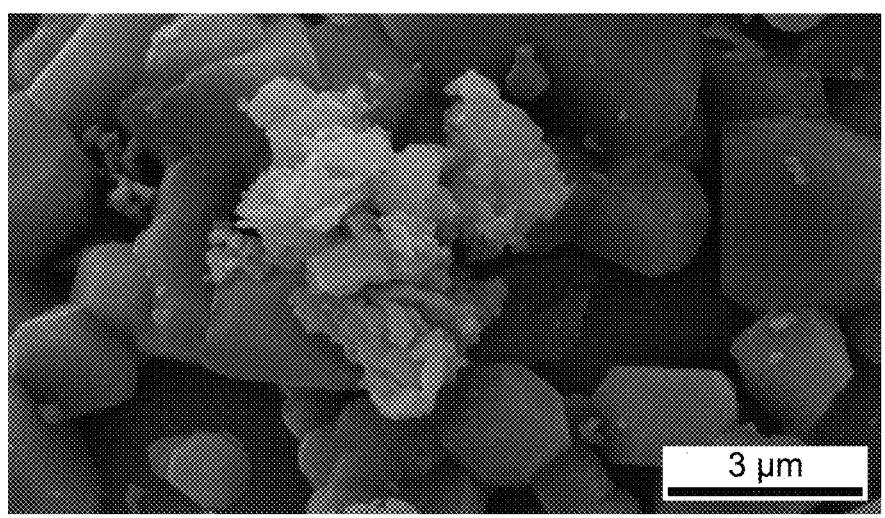
FIG. 5B shows a SEM image of a $ZrO_2@Mg_6MnO_8$ nanocomposite at a resolution of 2 μm, according to certain embodiments.
Figure 5C:
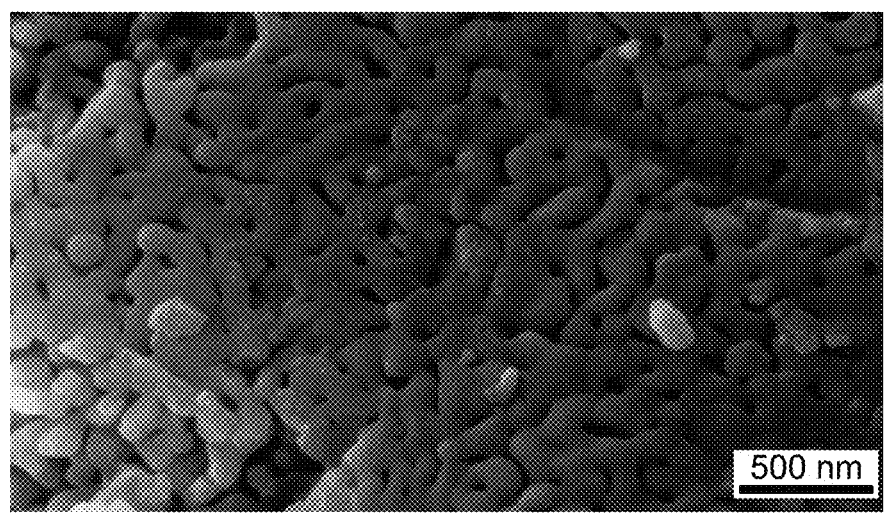
FIG. 5C shows a SEM image of a $ZrO_2@Mg_6MnO_8$ nanocomposite at a resolution of 500 nanometers (nm), according to certain embodiments.

As may be determined by scanning electron microscopy, of which FIGS. 5A to 5C are illustrative examples, a minor fraction of the particles obtained by the process of this disclosure may be fibrous, acicular or cylindrical. Expressed differently a major fraction of the particles obtained by the process may possess sphericity and/or roundness. Typically at least 20 wt. % of the particles of $ZrO_2 \cdot Mg_6MnO_2$ nanocomposite have an aspect ratio of less than about 2. In certain embodiments, at least of 30 wt. % or at least 40 wt. % of the particles of $ZrO_2 \cdot Mg_6MnO_2$ nanocomposite have an aspect ratio of less than 2.

The particles of $ZrO_2 \cdot Mg_6MnO_2$ nanocomposite obtained by the process of this disclosure may typically have a median volume particle size (Dv50), as determined by scanning electron microscope (SEM) analysis, of from about 1 to about 10 µm, for example from about 1 to about 8 µm or from about 1 to about 6 µm. In some embodiments, the nanocomposite may be further exemplified by a Dv10, as determined by SEM analysis, of from about 100 to 500 nm, for example from about 100 to about 400 nm or from 100 to 300 nm.

Based on the medium volume particle size (Dv50) and the observed Dv10 value in some embodiments, the particles of $ZrO_2 \cdot Mg_6MnO_2$ nanocomposite may possess a broad particle size distribution. The presence of both nanoparticles and supra-micron sized particles in the nanocomposite may provide for an increased packing efficiency thereof: nanoparticles may in effect fill gaps between larger particles. This effect may maximize the surface area of the nanocomposite which is available for interaction with fluid materials, which may be beneficial where the nanocomposite is to be utilized in heterogeneous catalysis or for adsorption. Moreover, in certain applications, the broad particle size distribution may provide for reduced friction between particles and thereby improved flowability of the particulate nanocomposite.

It is not however precluded in the present method, that the particles directly obtained from the calcination step may be subjected to at least one of comminution, homogenization or classification in order to moderate the particle size distribution thereof.

In some embodiments, a heterogeneous catalyst includes the particulate mesoporous nanocomposite. A heterogeneous catalyst is a catalyst that exists in a different phase from the reactants in a chemical reaction. Herein, where the catalyst will comprise a particulate solid, the reactants may be gases and/or liquids. The catalytic process involves the reactants adsorbing onto the surface of the solid catalyst, where the reaction takes place, and then desorbing the products after the reaction. The catalyst itself remains chemically unchanged during the reaction. Where there are no substantial deposits in the pores of the nanocomposite and the catalyst maintains its structural integrity during the catalyzed reaction, a heterogenous catalyst comprising the particulate mesoporous nanocomposite may be reused.

In a further aspect of the disclosure, there is provided the use of the particulate mesoporous nanocomposite in a filtration membrane. As used herein, the term "membrane" refers to a porous structure that is capable of separating components of a homogeneous or heterogeneous fluid. In particular, "pores" in the sense of the present disclosure indicate voids allowing fluid communication between different sides of the structure. When a homogeneous or heterogeneous fluid is passed through the membrane, some components of the fluid can pass through the pores of the membrane into a permeate stream, some components of the fluid can be retained by the membrane and can thus accumulate in a retentate and/or some components of the fluid can be rejected by the membrane into a rejection stream. Membranes can be of various thicknesses, with homogeneous or heterogeneous structures. Membranes can be in the form of flat sheets or bundles of hollow fibers. Membranes can also be in various configurations, including but not limited to spiral wound, tubular, hollow fiber, and other configurations identifiable to a skilled person upon a reading of the present disclosure. Membranes can also be classified according to their pore diameter. Membranes can be neutral or charged, and particle transport can be active or passive. The latter can be facilitated by pressure, concentration, and chemical or electrical gradients of the membrane process.

The particulate nanocomposite material of the present disclosure presents several advantages, in particular a significantly enhanced surface area, which boosts reactivity and efficiency in applications such as catalysis and adsorption. The well-defined pore network of the nanocomposite facilitates improved diffusion of molecules, making it highly effective in processes such as catalysis and separation. The high adsorption capacity of mesoporous material allows for selective trapping of molecules, making them ideal for applications like gas storage, water treatment, and pollutant removal. When combined with other substances in a composite material, the mesopores of the present nanocomposite can provide synergistic effects that enhance properties such as thermal stability and catalytic activity, making the nanocomposite versatile and valuable for a wide range of advanced applications.

EXAMPLES

Figure 2:
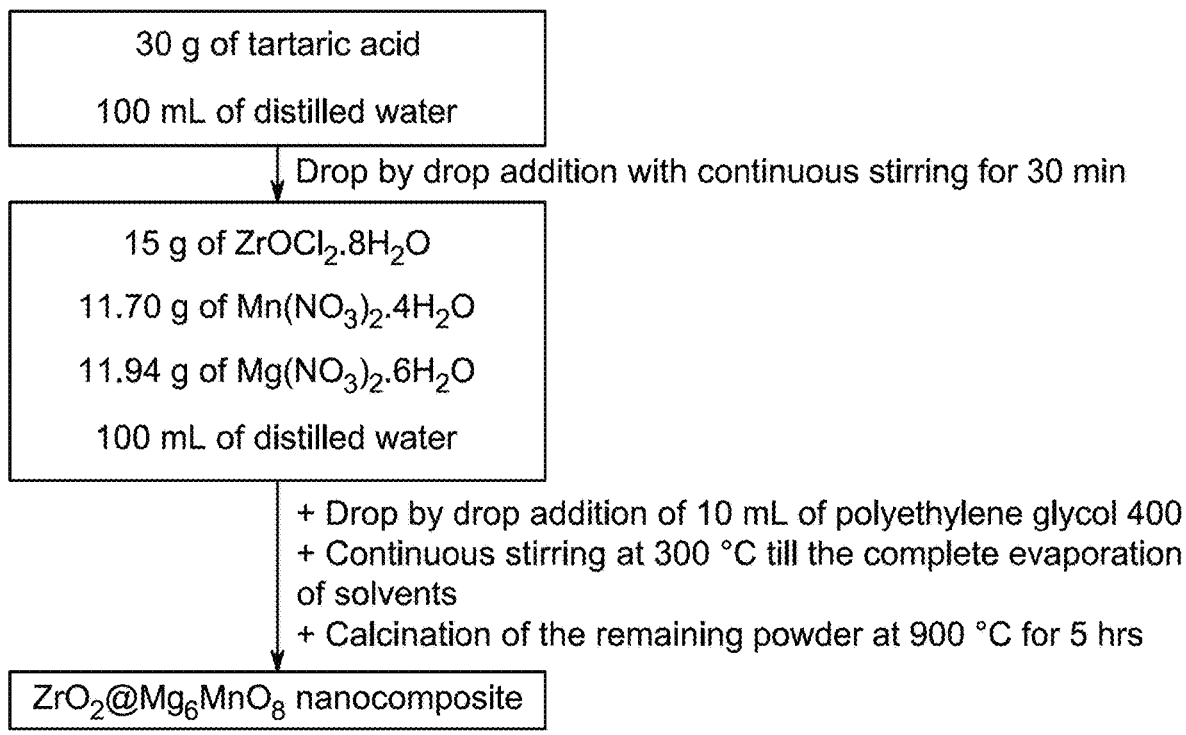
FIG. 2 illustrates an experimental process for producing $ZrO_2@Mg_6MnO_8$ nanocomposite using Pechini sol-gel method, according to certain embodiments.

The following examples demonstrate the particulate mesoporous nanocomposite $ZrO_2 \cdot Mg_6MnO_8$, synthesized using a Pechini sol-gel method, as depicted in FIG. 2. The examples are provided solely for illustration and are not to be construed as limitations of the present disclosure, as many variations thereof are possible without departing from the spirit and scope of the present disclosure.

Example 1: Chemicals

According to the present disclosure, all chemicals used herein were sourced from Sigma-Aldrich chemical company. Further, zirconyl chloride octahydrate ($ZrOCl_2 \cdot 8H_2O$), manganese nitrate tetrahydrate ($Mn(NO_3)_2 \cdot 4H_2O$), magnesium nitrate hexahydrate ($Mg(NO_3)_2 \cdot 6H_2O$), tartaric acid ($C_4H_6O_6$), and polyethylene glycol 400 ($H(OCH_2CH_2)_nOH$) were employed as the primary reagents in the synthesis of the particulate $ZrO_2@Mg_6MnO_8$ nanocomposite.

Example 2: Synthesis of $ZrO_2@Mg_6MnO_8$ nanocomposite

According to the present disclosure, for synthesizing $ZrO_2@Mg_6MnO_8$ nanocomposite, around 15.00 grams (g) of $ZrOCl_2 \cdot 8H_2O$, 11.70 g of $Mn(NO_3)_2 \cdot 4H_2O$, and 11.94 g of $Mg(NO_3)_2 \cdot 6H_2O$ were dissolved in 100 mL distilled water to prepare metal nitrate solution. Further, around 30.00 g of tartaric acid was dissolved in 100 mL of distilled water. The tartaric acid solution was then added dropwise to the above metal nitrate solution with continuous stirring for 30 minutes (min) using magnetic stirring. Furthermore, 10 mL of polyethylene glycol 400 was added dropwise to the mixture with continuous stirring at 300° C. until complete evaporation of the solvents was achieved. The resultant powder was transferred for calcining at 900° C. for 5 hours to obtain the $ZrO_2@Mg_6MnO_8$ nanocomposite. Further, the synthesis process of the $ZrO_2@Mg_6MnO_8$ nanocomposite is highlighted in FIG. 2.

To evaluate the structural, elemental, and morphological properties the synthesized nanocomposite, it was characterized using X-ray diffraction (XRD), energy-dispersive X-ray spectroscopy (EDX), $N_2$ adsorption/desorption analyzer, and scanning electron microscopy (SEM).

Figure 3:
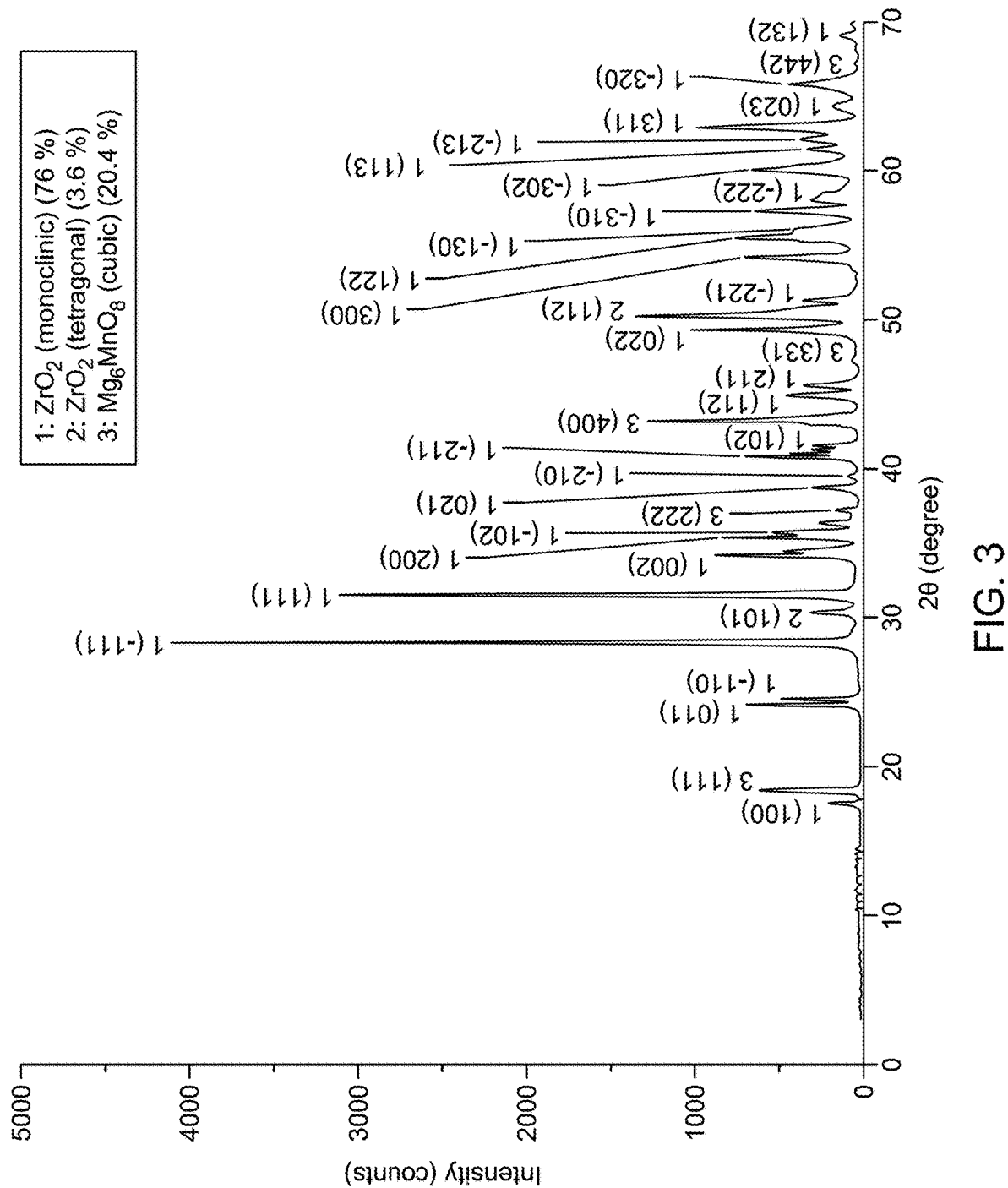
FIG. 3 depicts an X-ray diffraction (XRD) pattern of a $ZrO_2@Mg_6MnO_8$ nanocomposite including 76 percent by weight (wt. %) monoclinic zirconium dioxide ($ZrO_2$), 3.6 wt. % tetragonal zirconium dioxide ($ZrO_2$), and 20.4 wt. % a cubic magnesium manganese oxide ($Mg_6MnO_8$), according to certain embodiments.

FIG. 3 shows the XRD patterns of the $ZrO_2@Mg_6MnO_8$ nanocomposite. The nanocomposite includes: 76 percent by weight (wt. %) $ZrO_2$ in a monoclinic crystal system that is identified in the International Centre for Diffraction Data (ICDD) entry JCPDS No. 00-036-0420, the disclosure of which is incorporated herein in its entirety; 3.6 wt. % $ZrO_2$ in a tetragonal crystal system identified in the ICDD entry JCPDS No. 01-088-1007, the disclosure of which is incorporated herein in its entirety; and, 20.4 wt. % $Mg_6MnO_8$ in a cubic system identified in the ICDD entry JCPDS No. 01-073-2157, the disclosure of which is incorporated herein in its entirety. Further examination of the patterns of the monoclinic $ZrO_2$ exhibiting diffraction peaks at 2θ values of 17.44°, 24.05°, 24.51°, 28.19°, 31.49°, 34.25°, 35.53°, 36.26°, 38.65°, 39.39°, 40.86°, 41.22°, 44.79°, 45.53°, 49.30°, 51.23°, 54.07°, 55.46°, 56.00°, 57.29°, 58.03°, 60.04°, 61.41°, 62.07°, 62.89°, 64.27°, 65.83°, and 69.04°, corresponding to the Miller indices (100), (011), (−110), (−111), (111), (002), (200), (−102), (021), (−210), (−211), (102), (112), (211), (022), (−221), (300), (122), (−130), (−310), (−222), (−302), (113), (−213), (311), (023), (−320), and (132), respectively. The tetragonal $ZrO_2$ shows peaks at 2θ angles of 30.29° and 50.31° with miller indices (101) and (112), respectively. Furthermore, the cubic $Mg_6MnO_8$ phase, diffraction peaks occur at 2θ values of 18.35°, 37.09°, 43.24°, 47.27°, and 67.21°, corresponding to the miller indices (111), (222), (400), (331), and (442), respectively. The average crystallite size of the nanocomposite was calculated to be about 66.19 nm.

Figure 4:
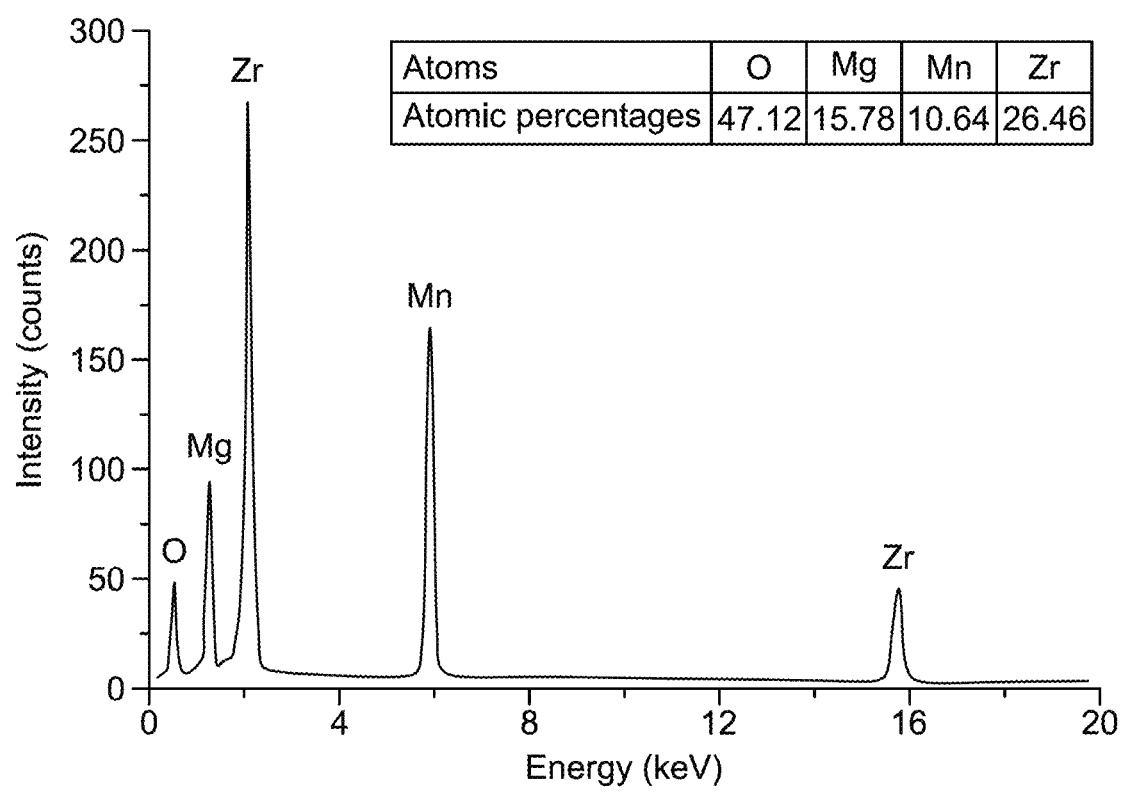
FIG. 4 depicts an energy-dispersive X-ray (EDX) spectrum of a $ZrO_2@Mg_6MnO_8$ nanocomposite, according to certain embodiments.

FIG. 4 shows the EDX spectrum of the $ZrO_2@Mg_6MnO_8$ nanocomposite, depicting the elemental composition of the sample. The prominent peaks corresponding to the elements oxygen (O), magnesium (Mg), manganese (Mn), and zirconium (Zr). The atomic percentages (at. %) of these elements are as follows, oxygen accounts for 47.12 at. %, magnesium accounts for 15.78 at. %, manganese accounts for 10.64 at. %, and zirconium accounts for 26.46 at. %. The atomic percentages confirm the synthesis of the nanocomposite, with $ZrO_2$ and $Mg_6MnO_8$ as its main components. The characteristic peaks at various energy levels are indicative of the elemental distribution within the nanocomposite, further supporting the composition of the material.

FIGS. 5A-5C show the SEM analysis, performed to evaluate the morphological characteristics of the $ZrO_2@Mg_6MnO_8$ nanocomposite material at different magnifications. As can be seen from FIG. 5A, at 15000 times magnification, the nanocomposite reveals an agglomeration of irregularly shaped particles with a relatively rough surface morphology. Further, as can be seen from FIG. 5B, at 30000 times magnification, more detailed features are visible, illustrating polyhedral particles with varying sizes and well-defined edges, which may indicate the heterogeneous nature of the composite. Furthermore, as can be seen from FIG. 5C, at the highest magnification of 120000 times, the nanocomposite comprises both nano-sized particles and larger particles which possess a porous surface which contributes to the high surface area of the composite. The surface of the larger particles has a coralline appearance which may be attributed to an agglomeration of higher aspect ratio nanoparticles which possess some sphericity contributing to rounded extremities and continuous meandering paths of nanocomposite material. The aforementioned observations suggest that the $ZrO_2@Mg_6MnO_8$ nanocomposite exhibits a multi-scale porous structure, which may enhance the performance of the nanocomposite in various applications, particularly in adsorption processes, due to the increased surface area.

Figure 6:
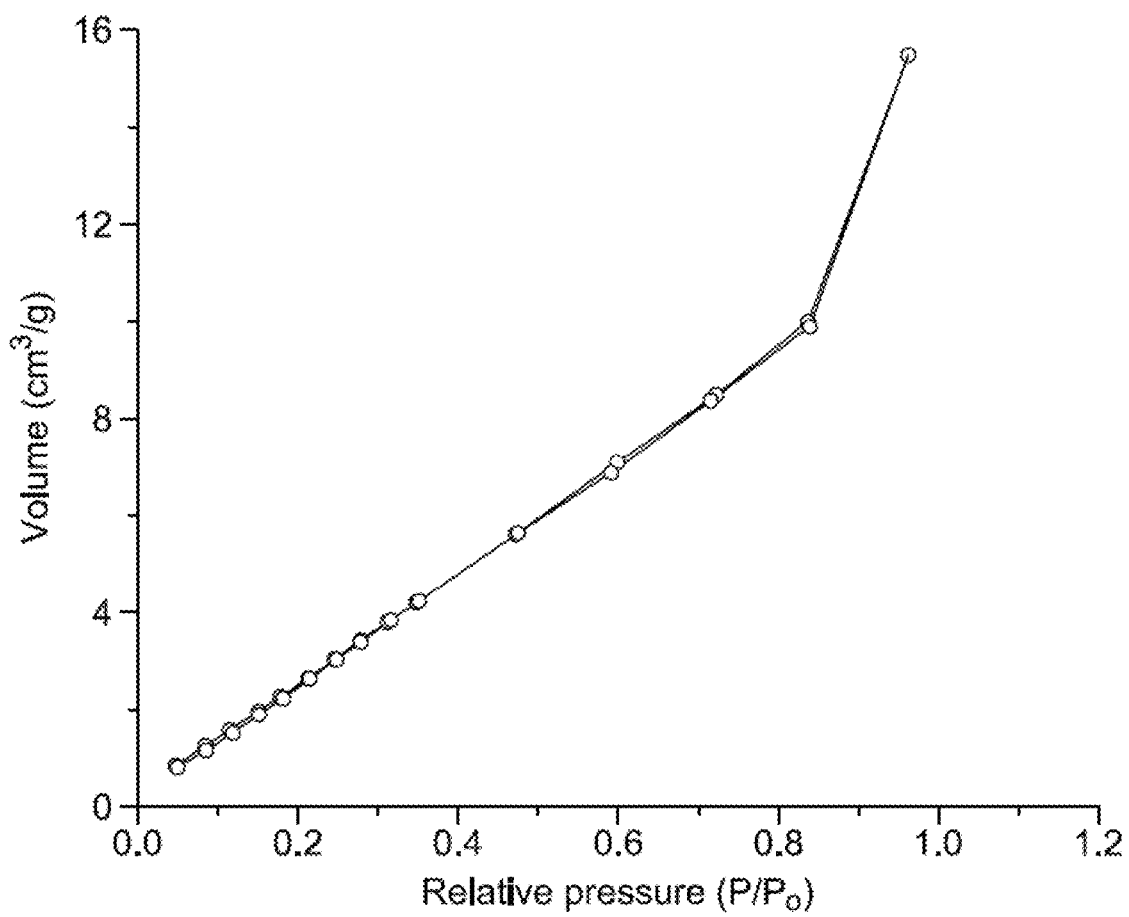
FIG. 6 illustrates the nitrogen adsorption/desorption isotherm of a $ZrO_2@Mg_6MnO_8$ nanocomposite, according to certain embodiments.

Further, FIG. 6 illustrates the $N_2$ adsorption/desorption isotherm of the $ZrO_2@Mg_6MnO_8$ nanocomposite, which follows a type IV isotherm characteristic of mesoporous materials. The gradual increase in nitrogen adsorption volume at relatively low pressures, followed by a more rapid increase at relatively high pressures, indicates capillary condensation within the mesopores. The aforementioned evaluation may be corroborated by the surface texture properties, as listed in Table 1 hereinbelow, where the BET surface area is 17.02 m²/g, the total pore volume as determined by Barrett-Joyner-Halenda (BJH) analysis is 0.0251 cm³/g, and the mean pore diameter as determined by Barrett-Joyner-Halenda (BJH) analysis is 3.04 nm. The mean pore diameter of 3.04 nm confirms that the sample is mesoporous, as it falls within the range of 2 nm to 50 nm, distinguishing it from microporous materials, which have pore diameters of up to 2 nm. The isotherm type and pore characteristics suggest that the $ZrO_2@Mg_6MnO_8$ nanocomposite has a well-developed mesoporous structure, which may enhance the potential for applications in adsorption and catalysis. The mesoporosity of the nanocomposite, combined with a moderate surface area of the nanocomposite, indicates suitability for various potential applications.

TABLE 1

| BET surface area (m²/g) | Total pore volume (cm³/g) | Mean pore diameter (nm) |
| --- | --- | --- |
| 17.02 | 0.0251 | 3.04 |

The aspects of the present disclosure provide the $ZrO_2@Mg_6MnO_8$ nanocomposite, synthesized efficiently using the Pechini sol-gel method. The method, as disclosed herein, may be efficient and produce a well-defined mesoporous structure, which is vital for enhancing the performance of the $ZrO_2@Mg_6MnO_8$ nanocomposite in applications like adsorption and catalysis. In particular, the present disclosure defines a combination of zirconia and magnesium-manganese oxides in a composite, which results in a nanocomposite with enhanced surface area, controlled particle size, and desirable structural properties. The nanocomposite, as described herein, exhibited a monoclinic and tetragonal $ZrO_2$ phase combined with a cubic $Mg_6MnO_8$ phase with an average crystallite size of about 66.19 nm. The surface properties of the $ZrO_2@Mg_6MnO_8$ nanocomposite revealed a rough surface morphology at low magnification and polyhedral particles at higher magnification. The porous surface observed at higher magnifications contributes to the high surface area of the $ZrO_2@Mg_6MnO_8$ nanocomposite, which may render it well-suited for adsorption applications in industrial chemistry. The evaluations, as conducted with respect to the present disclosure, may indicate that the scalability and adaptability of the ZrO2@Mg6MnO8 nanocomposite may be ideal for broad-scale commercial applications. The experimental data supports the potential effectiveness of the $ZrO_2@Mg_6MnO_8$ nanocomposite in various industries. The $ZrO_2@Mg_6MnO_8$ nanocomposite is versatile in nature and has desirable prospects for integration into environmental cleanup processes, industrial catalysts, and high-performance filtration systems.

Numerous modifications and variations of the present disclosure are possible in light of the above teachings. It is, therefore, to be understood that within the scope of the appended claims, the invention may be practiced otherwise than as specifically described herein.

The invention claimed is:

1. A particulate mesoporous nanocomposite having the general formula $ZrO_2 \cdot Mg_6MnO_8$ and comprising, as determined by X-ray diffraction, a monoclinic $ZrO_2$ crystalline phase, a tetragonal $ZrO_2$ crystalline phase and a cubic $Mg_6MnO_8$ crystalline phase,
wherein the nanocomposite comprises, based on the weight of the nanocomposite;
from about 70 to about 90 wt. % of $ZrO_2$; and,
from about 10 to about 30 wt. % of $Mg_6MnO_8$.

2. The particulate mesoporous nanocomposite according to claim 1, wherein the nanocomposite comprises, based on the weight of the nanocomposite:
from about 75 to about 85 wt. % of $ZrO_2$; and,
from about 15 to about 25 wt. % of $Mg_6MnO_8$.

3. The particulate mesoporous nanocomposite according to claim 1, wherein, based on the total weight of $ZrO_2$, at least about 90 wt. % of the $ZrO_2$ is in the monoclinic crystalline phase.

4. The particulate mesoporous nanocomposite according to claim 3, wherein, based on the total weight of $ZrO_2$, at least about 92 wt. % of the $ZrO_2$ is in the monoclinic crystalline phase.

5. The particulate nanocomposite material according to claim 1 having a surface area of from about 10 to about 30 $m^2/g$, as determined by Brunauer-Emmett-Teller (BET) analysis.

6. The particulate nanocomposite material according to claim 5 having a surface area of from about 10 to about 20 $m^2/g$, as determined by Brunauer-Emmett-Teller (BET) analysis.

7. The particulate nanocomposite according to claim 1 having, as determined by Barrett-Joyner-Halenda (BJH) desorption analysis:
a median pore diameter of from about 2 to about 5 nm; and,
a pore volume of from about 0.01 to about 0.1 $cm^3/g$.

8. The particulate nanocomposite according to claim 7 having, as determined by Barrett-Joyner-Halenda (BJH) desorption analysis:
a median pore diameter of from about 2 to about 4 nm; and,
a pore volume of from about 0.01 to about 0.05 $cm^3/g$.

9. A particulate mesoporous nanocomposite having the general formula $ZrO_2 \cdot Mg_6MnO_8$ and comprising, as determined by X-ray diffraction, a monoclinic $ZrO_2$ crystalline phase, a tetragonal $ZrO_2$ crystalline phase and a cubic $Mg_6MnO_8$ crystalline phase,
wherein the median crystallite size of the nanocomposite is from about 60 to about 70 nm, as determined by X-ray diffraction.

10. A method for preparing the particulate mesoporous nanocomposite as defined in claim 1, the method comprising:
forming an aqueous mixture by adding in a dropwise manner an aqueous solution of a chelating agent into an aqueous solution of a magnesium salt, a manganese salt and a zirconium salt;
adding a polyol in a dropwise manner into the aqueous mixture to form a gel;
heating the gel under stirring at a temperature of from about 200° C. to about 400° C. for a sufficient duration to form a dry powder; and,
calcining the dry powder at a temperature of from about 700° C. to about 1000° C. to form the nanocomposite material.

11. The method according to claim 10, wherein:
the magnesium salt is selected from the group consisting of magnesium sulfate ($MgSO_4$), magnesium nitrate ($Mg(NO_3)_2$), magnesium chloride ($MgCl_2$) and magnesium acetate ($Mg(CH_3COO)_2$);
the manganese salt is selected from the group consisting of manganese sulfate ($MnSO_4$), manganese nitrate ($Mn(NO_3)_2$), manganese chloride ($MnCl_2$) and manganese acetate ($Mn(CH_3COO)_2$);
the zirconium salt is selected from the group consisting of zirconium oxysulfate ($ZrOSO_4$), zirconium oxychloride ($ZrOCl_2$) and zirconium oxynitrate ($ZrO(NO_3)_2$); or, any combination of the above.

12. The method according to claim 10, wherein:
the magnesium salt is magnesium nitrate ($Mg(NO_3)_2$);
the manganese salt is manganese nitrate ($Mn(NO_3)_2$); and,
the zirconium salt is zirconium oxychloride ($ZrOCl_2$).

13. The method according to claim 10, wherein the chelating agent comprises at least one hydroxyalkyl carboxylic acid selected from the group consisting of citric acid, tartaric acid, malic acid, mandelic acid and 12-hydroxystearic acid.

14. The method according to claim 10, wherein the chelating agent comprises tartaric acid.

15. The method according to claim 10, wherein the polyol has a number average molecular weight of from about 200 to about 5000 g/mol. and an hydroxyl number of from about 25 to about 500 mg KOH/g.

16. The method according to claim 10, wherein the polyol is selected from the group consisting of: polyester polyols; polyether polyols; poly(ether-ester) polyols; poly(alkylene carbonate) polyols; and, mixtures thereof.

17. The method according to claim 10, wherein the polyol comprises a polyoxy ($C_2$-$C_3$)alkylene polyol.

18. The method according to claim 17, wherein the polyol comprises a polyoxy ($C_2$-$C_3$)alkylene polyol having a number average molecular weight of from about 200 to about 5000 g/mol. and an hydroxyl number of from about 25 to about 500 mg KOH/g.

19. A heterogeneous catalyst comprising the particulate mesoporous nanocomposite as defined in claim 1.

\* \* \* \* \*